(12) United States Patent
Diez

(10) Patent No.: US 7,806,416 B2
(45) Date of Patent: *Oct. 5, 2010

(54) CYLINDER HEAD GASKET

(75) Inventor: Armin Diez, Lenningen (DE)

(73) Assignee: ElringKlinger AG, Dettingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/266,505

(22) Filed: Nov. 3, 2005

(65) Prior Publication Data

US 2006/0103079 A1 May 18, 2006

(30) Foreign Application Priority Data

Nov. 12, 2004 (DE) .................. 10 2004 054 712

(51) Int. Cl.
*F02F 11/00* (2006.01)

(52) U.S. Cl. ..................................... 277/593

(58) Field of Classification Search ............... 277/591, 277/593–594, 598
See application file for complete search history.

(56) References Cited

U.S. PATENT DOCUMENTS

| | | | | |
|---|---|---|---|---|
| 4,852,893 A * | 8/1989 | Wesley | ........................ | 277/592 |
| 5,340,126 A * | 8/1994 | Antonini et al. | ............. | 277/601 |
| 5,341,779 A * | 8/1994 | Chen et al. | ............... | 123/193.3 |
| 5,730,448 A * | 3/1998 | Swensen et al. | ............. | 277/630 |
| 6,315,303 B1 * | 11/2001 | Erb et al. | ..................... | 277/593 |
| 6,336,639 B1 * | 1/2002 | Ishida et al. | ................ | 277/594 |
| 6,499,743 B2 | 12/2002 | Sadowski | ................... | 277/593 |
| 6,588,765 B2 * | 7/2003 | Hiramatsu et al. | .......... | 277/591 |
| 6,619,668 B1 * | 9/2003 | Pyre | ........................... | 277/644 |
| 6,719,301 B2 * | 4/2004 | Chen et al. | ................... | 277/601 |
| 6,951,338 B2 * | 10/2005 | Kestly | ........................ | 277/593 |
| 7,004,479 B2 * | 2/2006 | Oida et al. | .................. | 277/644 |
| 7,083,171 B2 * | 8/2006 | Oida et al. | .................. | 277/644 |
| 7,114,254 B2 * | 10/2006 | Reisel et al. | ............... | 29/888.3 |
| 2003/0197334 A1 * | 10/2003 | Werz et al. | ................... | 277/593 |
| 2004/0012157 A1 * | 1/2004 | Oida et al. | .................. | 277/626 |

(Continued)

FOREIGN PATENT DOCUMENTS

DE 30 23 728 C2 1/1983

(Continued)

OTHER PUBLICATIONS

U.S. Appl. No. 11/265,905, filed Nov. 2005, Diez.

*Primary Examiner*—Vishal Patel
*Assistant Examiner*—Gilbert Y Lee

(57) ABSTRACT

Cylinder head gasket with a ring-shaped metallic sealing element extending around a through-opening of the gasket, wherein, for automatic adaptation to changes in the width of the sealing gap to be sealed by the cylinder head gasket, the sealing element is of such spherical shape in cross section at its sides facing the two main surfaces of the gasket as to result in convex surfaces of the sealing element that face the main surfaces of the gasket and each have a crest, and, in the unpressed state of the gasket, these crests, in cross section perpendicular to the longitudinal center axis of a metallic sealing strand forming the sealing element, are laterally offset from one another in the direction of a gasket plane defined by the gasket so that the spacing of planes running parallel to the gasket plane and tangentially to the convex surfaces of the sealing element varies when these convex surfaces tilt about the longitudinal center axis of the sealing strand.

11 Claims, 6 Drawing Sheets

U.S. PATENT DOCUMENTS

2005/0242530 A1 * 11/2005 Oida et al. .................. 277/644

FOREIGN PATENT DOCUMENTS

| | | | |
|---|---|---|---|
| DE | 195 20 695 | C1 | 7/1996 |
| DE | 195 12 650 | A1 | 10/1996 |
| EP | 0 825 342 | A1 | 2/1998 |
| EP | 1 350 994 | A2 | 10/2003 |

* cited by examiner

CYLINDER HEAD GASKET

The present disclosure relates to the subject matter disclosed in German Application No. 10 2004 054 712.2 of Nov. 12, 2004, which is incorporated herein by reference in its entirety and for all purposes.

BACKGROUND OF THE INVENTION

The invention relates to an at least substantially metallic cylinder head gasket with a gasket plate having at least one sheet metal layer and at least one through-opening which, for sealing around the through-opening, is enclosed by a ring-shaped sealing element which is pressed when the cylinder head gasket is installed between engine component sealing surfaces.

The gasket plates of such cylinder head gaskets usually have several such through-openings, namely one or several combustion chamber through-openings for the cylinder or cylinders of the engine, as well as coolant through-openings and oil through-openings. The gasket plate also has screw holes through which there extend cylinder head screws, with which the cylinder head gasket is clamped between the engine component sealing surfaces of engine block (also called crankcase) and cylinder head. On the side of the engine block, the sealing surface can be formed apart from the actual engine block also by one or several cylinder liners, possibly also by parts of a chain case, and in some multi-cylinder engines a separate cylinder head and a separate cylinder head gasket are provided for each cylinder, and these cylinder head gaskets are then clamped between the engine block (possibly including cylinder liners) and the cylinder heads.

Most of the known cylinder head gaskets of the kind mentioned at the outset have a multi-layer gasket plate consisting, for example, of three sheet metal layers arranged one above the other, the two outer layers of which consist of sheet spring steel and around the through-openings to be sealed are provided with beads which are spring-elastically deformable in their height as sealing elements, for which the center layer is provided with so-called stoppers, i.e., deformation limiters, for preventing the beads from being flattened to too great an extent during clamping of the gasket between the engine component sealing surfaces and during operation of the engine—in view of the dynamic load on the beads during operation of the engine, excessive bead deformation would lead to permanent breakages as a result of crack formation. Such a cylinder head gasket is disclosed, for example, in U.S. Pat. No. 6,135,459. However, such a cylinder head gasket requires quite a considerable width of the so-called sealing gap delimited by the engine component sealing surfaces (when the engine is cold and out of operation)—this spacing of the engine component sealing surfaces from one another is usually referred to as sealing gap dimension or assembly dimension (of the cylinder head gasket). For cost reasons there are endeavors to reduce as far as possible the number of sheet metal layers required for a cylinder head gasket. With a given engine, for which, for example, a three-layered cylinder head gasket has hitherto been used, this results in thicker metal sheets having to be used for gaskets with a smaller number of sheet metal layers, because an otherwise necessary decreasing of the sealing gap dimension would necessitate structural changes to the engine itself, which is not accepted by the manufacturer of the engine. However, a bead in a thicker sheet metal layer must have a greater width (in section perpendicular to the longitudinal direction of the bead) in order to have the same elastic deformation characteristics as a bead formed in a thinner metal sheet, and as the through-openings to be sealed by sealing elements in cylinder head gaskets designed for modern engines often lie very close to one another, in many cases wider beads cannot be realized owing to lack of space.

For the sake of completeness, it will be pointed out that the above-described elasticity of sealing beads with respect to their height is necessary because under the effect of the high combustion gas pressures occurring upon ignition of a cylinder, when the engine is in operation, the cylinder head, which is not an absolutely rigid component, arches somewhat over the cylinder which has just been ignited and, consequently, the spacing of the engine component sealing surfaces from one another around this cylinder becomes greater, i. e., the sealing gap width increases, so that the bead must have the characteristic that when it is relieved of load its height will increase in a spring-elastic and hence reversible manner in order that the bead will not lose its sealing function upon widening of the sealing gap.

The object of the present invention was to develop an alternative sealing element for a cylinder head gasket of the kind mentioned at the outset, which can replace a sealing bead that is elastic with respect to its height, and the width of which is at least substantially independent of the thickness of the metal sheets used for manufacturing the cylinder head gaskets.

SUMMARY OF THE INVENTION

To accomplish this object, the invention proceeds from a cylinder head gasket with a gasket plate having at least one sheet metal layer and at least one through-opening which, for sealing around the through-opening, is enclosed by a ring-shaped sealing element which comprises a metallic sealing strand having a longitudinal center axis and is pressed when the cylinder head gasket is installed between engine component sealing surfaces, the sealing element being shaped and held in the cylinder head gasket so that sections of the sealing strand are tiltable about its longitudinal center axis and so that during the tilting a restoring moment is built up as a result of a spring-elastic deformation of the sealing element.

To achieve the above object it is proposed, in accordance with the invention, that the cylinder head gasket be designed so that at the sides of the sealing element facing the two main surfaces of the gasket plate, in cross section perpendicular to the longitudinal center axis of the sealing strand, the sealing element is of such spherical shape as to result in convex surfaces of the sealing element that face the main surfaces of the gasket plate and each have a crest, and, in the unpressed state of the cylinder head gasket, these crests, in cross section perpendicular to the longitudinal center axis of the sealing strand, are laterally offset from one another in the direction of a gasket plane defined by the gasket plate so that the spacing of planes running parallel to the gasket plane and tangentially to the convex surfaces of the sealing element varies when these convex surfaces tilt about the longitudinal center axis of the sealing strand.

When a cylinder head gasket according to the invention is installed, i. e., clamped between engine component sealing surfaces, opposed forces act on the crests of the sealing element designed in accordance with the invention, and as the crests of the unpressed sealing element are offset laterally from one another, these forces form a pair of forces, which upon applying the clamping forces, i. e., upon tightening the cylinder head screws, tilts the cross section of the sealing element or the sealing strand, more particularly, in the sense that in a projection of the (instantaneously effective) crests onto the gasket plane, the transverse spacing of the crests from one another is decreased; in accordance with the invention the aforementioned tangential planes approach one another due to the design of the convex surfaces of the sealing element, and because of the spring-elastic characteristics of the sealing strand and the elastic and therefore reversible deformation of the sealing element as a result of the tilting, a restoring moment occurs, as a result of which, when during operation of the engine the sealing gap width periodically increases and decreases again, the sealing element follows the movements of the engine component sealing surfaces and, consequently, is also able to fulfill its sealing function when the spacing of the engine component sealing surfaces from one another becomes larger (in comparison with the sealing gap width when the engine is cold and out of operation).

Thus, in accordance with the invention, the cross section of the sealing element is designed so that its height effective for the sealing operation (measured perpendicularly to the gasket plane) changes continuously upon tilting of the sealing strand cross section, with this height initially decreasing when the cylinder head gasket is installed and increasing again when the clamping forces are reduced (the same applies to the spacing of the tangential planes defined hereinabove from one another).

When hereinabove mention is made of the fact that sections of the sealing strand are to be tiltable about its longitudinal center axis, this applies to each section along the circumference of the sealing element, i.e., theoretically the sealing element can be divided up along the longitudinal center axis of the sealing strand into infinitesimally thin sections, each section of which can be tilted about the longitudinal axis of the sealing strand, and when each section is tilted about the same angle, an elastic deformation of the sealing element also takes places, which results in generation of the aforementioned restoring moment.

A cylinder head gasket which constitutes the starting point for the inventive solution to the set object was defined hereinabove, and a similar such cylinder head gasket is disclosed in FIG. 10 of DE-195 12 650-A1 of Elring Klinger GmbH. However, a completely different problem was to be solved by this known cylinder head gasket, and in this known cylinder head gasket the sealing element also has a completely different function: the gasket plate of this known cylinder head gasket has a single sheet steel layer extending over the entire gasket plate, and an edge portion thereof which surrounds a combustion chamber through-opening of the cylinder head gasket was folded back onto itself so as to form a so-called fold flange ring of U-shaped cross section around the combustion chamber through-opening. Directly beside and radially outside of this fold flange ring there lie on the sheet steel layer three wire rings of circular cross section which are each closed within themselves and are concentric with one another and with the combustion chamber through-opening, and the diameter of these wire rings is somewhat larger than the sheet thickness of the sheet steel layer, so that they project somewhat over the fold flange ring. For this reason, when this known cylinder head gasket is installed, the largest specific surface pressures between the engine component sealing surfaces and the cylinder head gasket occur in the area of these wire rings. During operation of a reciprocating-piston internal combustion engine, the engine component sealing surfaces delimiting the sealing gap between cylinder head and engine block will unavoidably also become displaced relative to one another parallel to the gasket plane, for example, when owing to the high gas pressure occurring in a cylinder during the ignition, the cylinder head and hence the cylinder head sealing surface arch somewhat and the pressure between the cylinder head gasket, on the one hand, and the engine component sealing surfaces, on the other hand, is reduced somewhat, albeit only for quite a short time in each case. However, differently sized temperature expansion coefficients of the materials of cylinder head and engine block also result in such sliding movements of the two engine component sealing surfaces relative to each other, which are particularly large in the case of engines with a cylinder head made of a light metal alloy and an engine block made of gray cast iron. From the two above-explained causes for the described sliding movements of the engine component sealing surfaces relative to one another it follows that these sliding movements are greatest around the combustion chambers of the engine. When sealing around a combustion chamber through-opening of a cylinder head gasket is mainly carried out by means of a bead, the sliding movements of the engine component sealing surfaces, in particular of the cylinder head sealing surface, relative to this bead result in frictional wear, above all, at the cylinder head sealing surface, but possibly also at the engine block sealing surface and at the bead forming the combustion chamber sealing element, which may result in failure of the gas sealing around a combustion chamber. In the known cylinder head gasket disclosed in DE-195 12 650-A1 the wire rings are to serve to intercept the described sliding movements of the engine component sealing surfaces relative to one another, because upon occurrence of such sliding movements, which are in the order of magnitude of a few tenths of a millimeter, the wire rings can roll on the one engine component sealing surface and are thus intended to prevent sliding friction between the cylinder head gasket and the engine component sealing surface adjacent to the wire rings—on the side of this known cylinder head gasket opposite the wire rings, when the gasket is installed, the sheet steel layer carrying the wire rings is pressed against the other engine component sealing surface, and the inventors of this known construction assumed that frictional wear is avoidable there during operation of the engine if the engine component sealing surface pressed against the wire rings is displaceable without restraint relative to the cylinder head gasket and to the other engine component sealing surface.

Finally, for the sake of completeness, it will also be pointed out that substantially metallic cylinder head gaskets with combustion chamber through-openings enclosed by ring-shaped elements of spherical cross section are known from DE-195 20 695-C1 of Elring Klinger GmbH and from U.S. Pat. No. 6,499,743. However, these known ring-shaped elements of spherical cross section are so-called stoppers, which are formed on a middle layer of a three-layer gasket and are to prevent excessive flattening of sealing beads which were stamped in the two outer sheet steel layers of the gasket and enclose the combustion chamber through-openings. However, in these spherical stoppers the crests of the convex surfaces of each stopper always lie exactly one over the other (in a plan view of the gasket plate), quite apart from the fact that according to the drawings of the two above-mentioned documents the sheet metal layers from which the stoppers were formed have such a large sheet thickness that even small tilting movements of the stoppers during operation of the engine appear totally impossible.

In principle, the above-explained characteristics of a sealing element according to the invention may also be used in a multi-layer cylinder head gasket, for example, in a cylinder head gasket with two sheet metal layers between which the sealing element according to the invention is arranged, as in the case of a widening of the sealing gap, the sheet metal layers remain pressed against the engine component sealing surfaces when as a result of the described restoring moment the effective height of the sealing element according to the invention increases. However, embodiments of the cylinder head gasket according to the invention are preferred, in which for direct pressing of the sealing element according to the invention against the engine component sealing surfaces, the sealing element is uncovered at the two main surfaces of the cylinder head gasket, which is also the case when in a multi-layer gasket the gasket plate is provided above and/or below the sealing element according to the invention with openings for passage of the sealing element. The greatest advantages are, however, achieved with cylinder head gaskets whose gasket plate has only a single sheet metal layer, as the above-mentioned problem in connection with a larger thickness of such a sheet metal layer can be avoided by use of a sealing element according to the invention, so that also with a predetermined, relatively large sealing gap dimension or assembly dimension in an only one-layer cylinder head gasket, through-openings lying close to one another can be sealed with sealing elements according to the invention, because these can be made narrower than a sealing bead having the necessary elasticity with respect to height in a correspondingly thick sheet metal layer.

The above-explained sliding movements of the engine component sealing surfaces relative to one another could result in sliding movements occurring between the engine component sealing surfaces and the sealing element according to the invention, even if the latter is always pressed sealingly against the engine component sealing surfaces. Frictional wear which might result from such sliding movements could, however, prove disadvantageous. When a cylinder head gasket according to the invention is designed so that the sealing element according to the invention rests directly against the engine component sealing surfaces of cylinder head and engine block when the gasket is installed, it is, therefore, recommended that the thickness and the compressive strength of the sealing element as well as its material be adapted to the specified materials and possibly to the locally varying stiffnesses of the engine component sealing surfaces and to the specified tightening torque of the cylinder head screws, so that upon occurrence of the movements of the engine component sealing surfaces relative to one another during operation of the engine (parallel to the plane defined by the sealing gap and perpendicular thereto) the sealing element does at least substantially only roll on and not slide on the engine component sealing surfaces. In all areas of the sealing element and at each point in time during operation of the engine the pressing forces between the engine component sealing surfaces and the sealing element are then sufficiently large to ensure overall and always a frictionally engaged coupling of the sealing element to the engine component sealing surfaces and to thus avoid sliding movements resulting in frictional wear.

Since the changes in the sealing gap width occurring during operation of the engine may differ locally and are different in most cases—for example, in the proximity of cylinder head screws they are smaller than in areas lying between cylinder head screws—the use of a sealing element is recommended, whose sealing strand is elastically twistable about its longitudinal center axis. In this connection, it is, however, pointed out that, in principle, the invention does not necessitate the use of spring steel, as the movements of the engine component sealing surfaces relative to one another occurring during operation of the engine are so small that normal steel is also suitable for manufacture of the sealing element.

In view of the smallness of the movements of the engine component sealing surfaces relative to one another, the contours of the convex surfaces of the sealing element can be relatively flat, which also leads to the advantage that when it rests directly against the engine component sealing surfaces, with the cylinder head gasket installed, the sealing element does not cause any permanent deformations of the engine component sealing surfaces, as may be the case with the wire rings of the known cylinder head gasket disclosed in DE-195 12 650-A1. Preferred embodiments of the cylinder head gasket according to the invention are, therefore, characterized in that in cross section perpendicular to the longitudinal center axis of the sealing strand the radii of curvature of the convex surfaces are larger than half the thickness of the sealing element measured perpendicularly to the gasket plane. In this connection, attention is also drawn to the following: the contours of the two convex surfaces of the sealing element do not have to be identical, although identical surface profiles are preferred, and in spite of use of the term "radius of the curvature" the definition of the invention may not be interpreted so narrowly that the cross-sectional profile of a convex surface of the sealing element according to the invention would have to be a circular arc, as this cross-sectional profile may also be a different convex roll-on curve, for example, part of an ellipse or circular arcs with radii of curvature of different size that pass over into one another.

Owing to the high pressing forces necessary for reliable gas sealing around a combustion chamber through-opening and the thus required compressive strength of a combustion chamber sealing element according to the invention, it is recommended, above all, for a sealing element serving to seal around a combustion chamber through-opening that the cross section of the sealing strand forming the sealing element be made to correspond approximately to a rectangle with spherical longitudinal sides.

Similarly to the wire rings of the cylinder head gasket according to FIG. 10 of DE-195 12 650-A1, the sealing element according to the invention could also lie loosely in a corresponding opening in the gasket plate of the cylinder head gasket, but this would make handling of the cylinder head gasket during shipment and installation in an engine more difficult. Embodiments of the cylinder head gasket according to the invention are, therefore, recommended, in which the sealing element is held in the cylinder head gasket by flexible, web-like or tongue-like holding elements which extend approximately transversely outwardly away from the sealing element and remain at least substantially flexible when the cylinder head gasket is installed, and the holding elements are arranged, preferably in spaced relation to one another, along the circumference of the sealing element. With regard to the flexibility of the holding elements still present when the cylinder head gasket is installed, it is pointed out that these need only be flexible insofar as they allow and do not impede at least to any appreciable extent the above-explained tilting movements of the sealing element. Since the clamping forces are applied by the cylinder head screws when the cylinder head gasket is installed, the specific surface pressures in relation to the unit of area are greatest in the vicinity of the cylinder head screws and hence of the screw holes of the cylinder head gasket. As the movements of the engine component sealing surfaces relative to one another are, consequently, smallest in the vicinity of these screw holes, it is advantageous to arrange the holding elements at such locations on the sealing element as lie closest to one of the screw holes respectively, which in preferred embodiments means that each holding element is directed towards a respective one of the screw holes. With such a construction the holding elements obstruct the above-explained tilting movements least of all.

A particularly simple design of the cylinder head gasket according to the invention is obtained when the sealing element forms one piece with a sheet steel layer of the gasket plate and is an integral component of this sheet steel layer, so that the aforementioned holding elements need not be attached to the sealing element and/or to the sheet steel layer holding the latter by spot-welding or the like. Embodiments are then preferred, in which the sheet steel layer has slot-shaped openings, produced, in particular, by punching, between the holding elements at the outer circumference of the sealing element, so that the holding elements pass over seamlessly into the sheet steel layer and the sealing element. In this case, the sealing element can be formed from the sheet steel layer itself by reshaping it, for example, by upsetting and stamping, but preferably by the sealing element being formed by an edge portion of the sheet steel layer which surrounds the associated through-opening and is folded back onto the sheet steel layer, an embodiment which can always be realized when the contour of the through-opening (in a plan view of the sheet metal layer) does not have any convex portions projecting in the direction towards the center of the through-opening—oil or coolant through-openings of cylinder head gaskets are often approximately arc-shaped, so that a fold formation would occur in the convex portion of the edge of such a through-opening if the edge portion of the sheet metal layer were folded back onto the sheet metal layer.

The invention is particularly well suited for cylinder head gaskets whose gasket plate has only one sheet steel layer which extends at least substantially over the entire gasket plate and may then be provided in a manner known per se on one or both sides over the entire surface or partially with a coating, for example, an elastomeric coating—such elastomeric coatings are for the purpose of so-called microsealing, i.e., compensation of surface roughnesses of the sealing surfaces of cylinder head and engine block, possibly also of the sealing surfaces of cylinder linings and/or parts of a chain case of the engine, which together with the sealing surfaces of the cylinder head and the actual engine block form the engine component sealing surfaces.

As will already be apparent from the aforesaid, the sealing element according to the invention is particularly well suited for sealing around a combustion chamber through-opening of the cylinder head gasket. If, however, the gasket plate of a cylinder head gasket consists substantially of a single, relatively thick sheet metal layer in which through-openings, which are not combustion chamber through-openings, are arranged so close to an adjacent through-opening or adjacent through-openings that beads with the necessary elasticity with respect to height cannot be accommodated, sealing around these other through-openings can similarly be effected with sealing elements according to the invention.

Further features, advantages and details of the invention will be apparent from the appended drawings and the following description of particularly advantageous embodiments of the cylinder head gasket according to the invention.

DETAILED DESCRIPTION OF THE INVENTION

Figure 1:
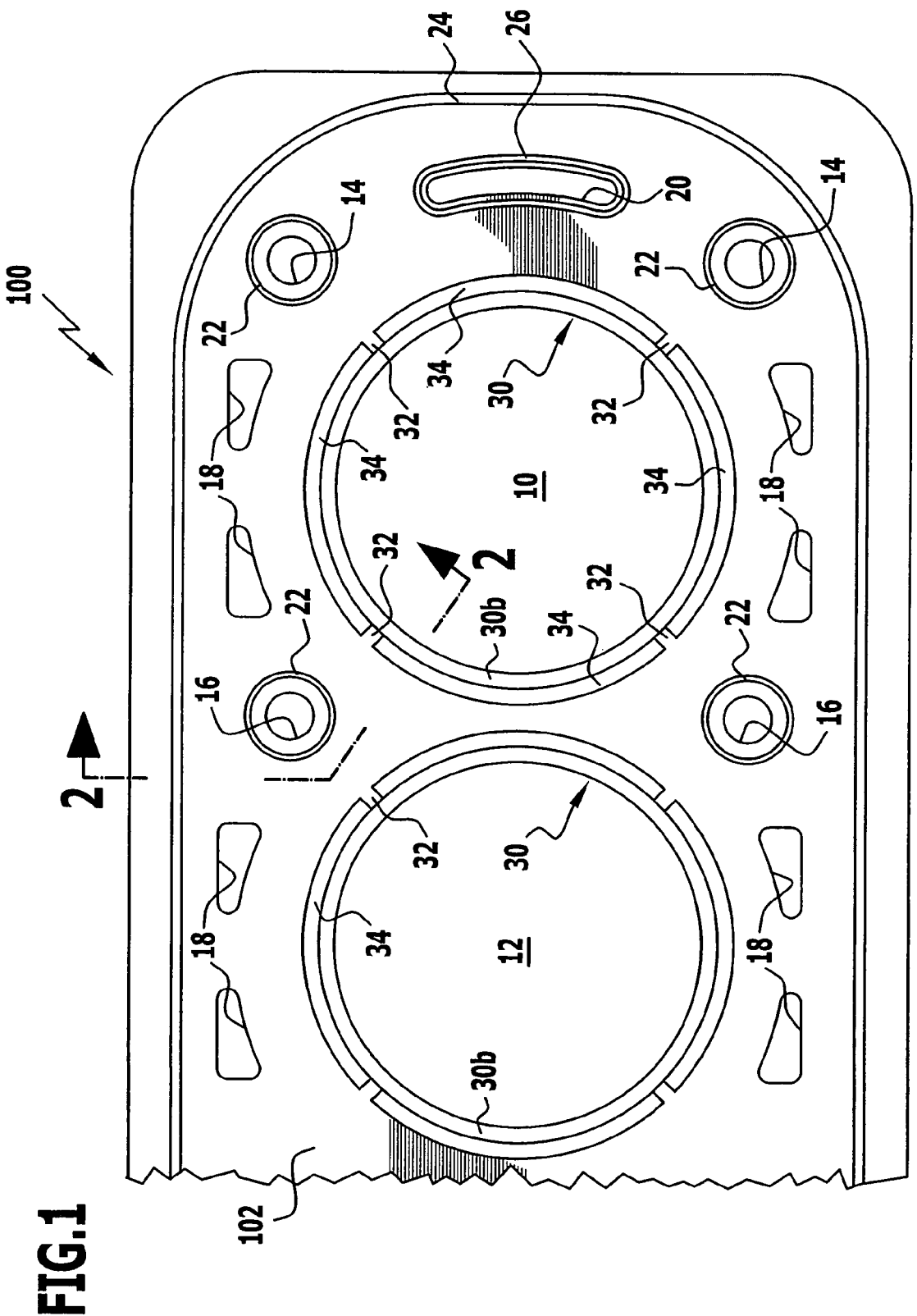
FIG. 1 shows a plan view of a section of a cylinder head gasket according to the invention.

The cylinder head gasket shown in FIG. 1 is to consist at least substantially of a single, one-piece sheet metal layer 102, which forms a gasket plate 100, in which several combustion chamber openings 10, 12, screw holes 14, 16 for cylinder head screws, water holes 18 for coolant to pass therethrough, and several oil holes 20 for engine oil to pass therethrough are formed—the cylinder head gasket shown is intended for a multi-cylinder in-line engine, but the invention may also be applied to cylinder head gaskets for other types of engine.

Figure 2:
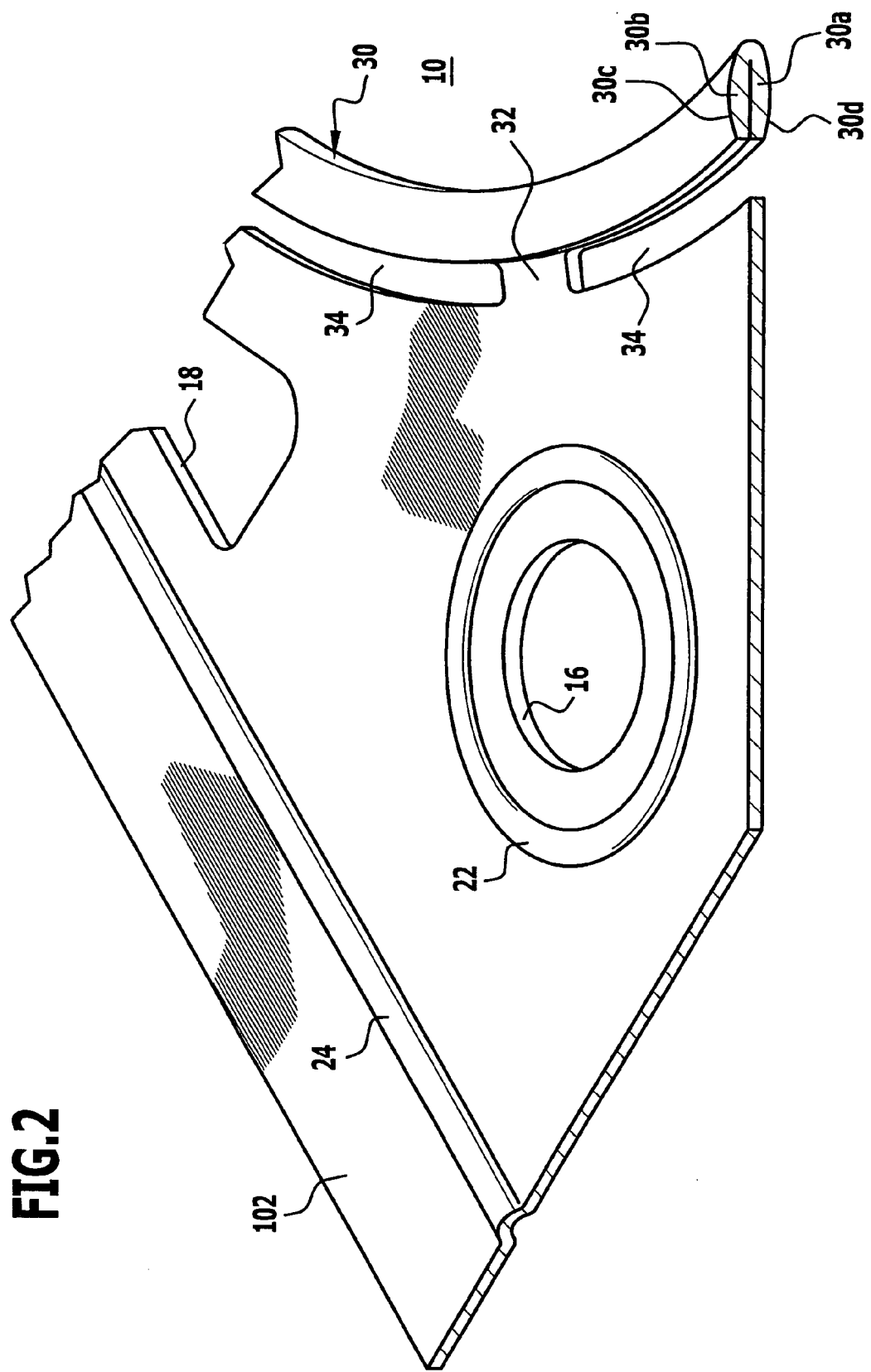
FIG. 2 shows an area of this cylinder head gasket in an isometric section corresponding to line 2-2 in FIG. 1.

In accordance with FIGS. 1 and 2, each of the screw holes 14, 16 is enclosed by a circular ring-shaped bead 22. This is a full bead which is stamped into the actual sheet metal layer 102 consisting of sheet spring steel and is elastic with respect to its height. Also stamped in the sheet metal layer 102 is a water sealing bead 24 which is similarly elastic with respect to its height. This is also a full bead, which extends in the proximity of the periphery of the gasket plate around the latter, and in a plan view of the cylinder head gasket is to be an approximately oval structure closed within itself and enclosing all combustion chamber openings, screw holes, water holes and oil holes. Finally, there are stamped in the sheet metal layer 102 sealing beads 26, which are elastic with respect to their height. These serve to seal the oil holes 20, each surround the latter in a closed manner and are likewise to be designed as full beads. In the illustrated embodiment, all of the beads 22, 24 and 26 project above one and the same main surface of the gasket plate 100, i.e., their convex sides face the viewer of FIG. 1.

Around each of the combustion chamber openings 10, 12, the gasket plate 100 is provided with a circular ring-shaped sealing element 30 according to the invention, which is referred to hereinbelow as combustion chamber sealing element and in the embodiment shown in FIG. 2 is formed by a circular ring-shaped portion of the sheet steel layer 102 enclosing the respective combustion chamber opening, which has been folded back onto itself and forms a so-called fold flange ring. As will be apparent from FIG. 2, this consists of a base portion 30a and a fold-back portion 30b. The base portion 30a passes over seamlessly via four holding elements 32 in the form of narrow webs into the actual sheet steel layer 102, and circular arc-shaped slots 34, which have been punched out of the sheet steel layer 102, extend around the combustion chamber sealing element 30 between the holding elements 32. As will be apparent from FIG. 1, each of the holding elements 32 is located close to one of the screw holes 14, 16 and is directed towards its center. Taking into account the sheet thickness and the spring-elastic characteristics of the sheet steel layer 102, the width and the length of the holding elements 32 are to be of such dimensions that the holding elements 32 are sufficiently flexible, and these holding elements do not obstruct at least to any appreciable extent the tilting movements of the combustion chamber sealing element 30, which will be described hereinbelow.

As will be apparent from FIG. 2, the combustion chamber sealing element 30 has an upper and a lower convex surface 30c and 30d, respectively. The purpose of these convex surfaces will be explained hereinbelow in conjunction with FIGS. 3A and 3B. This profiling of the combustion chamber sealing element 30 is preferably achieved by a stamping procedure, and the stamping should be performed after the folding-back of the fold-back portion 30b. The combustion chamber sealing element 30 may also be provided with a height profile and/or width profile and/or hardness profile along its circumference so as to take into consideration locally varying stiffnesses of the engine components between which the cylinder head gasket is to be installed.

In order that the combustion chamber sealing element 30 is evened out with respect to the center plane of the actual sheet steel layer 102 and does not project to a different extent over the two main surfaces of the actual sheet steel layer 102, it is advisable to design the stamping tool used for the stamping procedure such that in the course of the stamping procedure the web-like holding elements 32 will be bent with a slight S-shape (in a longitudinal section through the respective holding element).

In the cylinder head gasket shown in FIGS. 1 and 2, the various through-openings in the gasket plate 100 are arranged at such large spacings from one another that each through-opening that has to be sealed off around it could have a full bead or a so-called half bead allocated to it as sealing element. However, for the reasons set forth at the outset this does not apply, for example, for the combustion chamber openings 10, 12 when the web-like area of the gasket plate 100 remaining between these combustion chamber openings is substantially narrower than drawn in FIG. 1, and the same applies accordingly to other through-openings, for example, to the oil hole 20 when this is located substantially closer to the combustion chamber opening 10 than shown in FIG. 1—in this case the cylinder head gasket according to the invention would also be provided with a sealing element according to the invention for the oil hole 20.

Figure 3A:
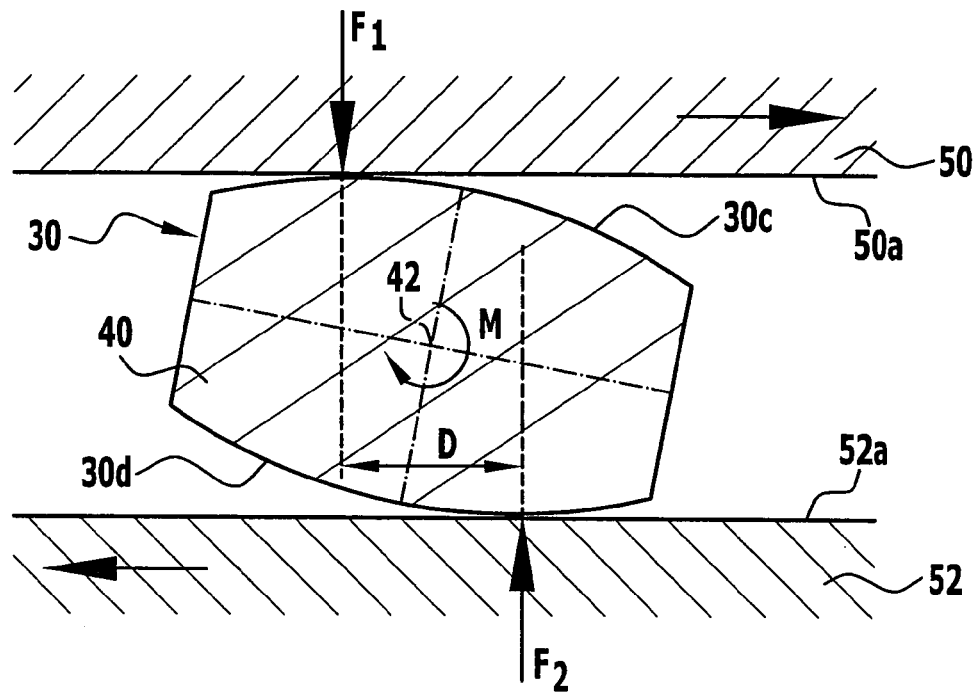
FIG. 3A shows a schematic section through an area of an inventive combustion chamber sealing element of the cylinder head gasket with adjacent areas of engine component sealing surfaces, more particularly, before tightening of the cylinder head screws, i.e., before pressing forces or at least appreciable pressing forces act upon the sealing element.
Figure 3B:
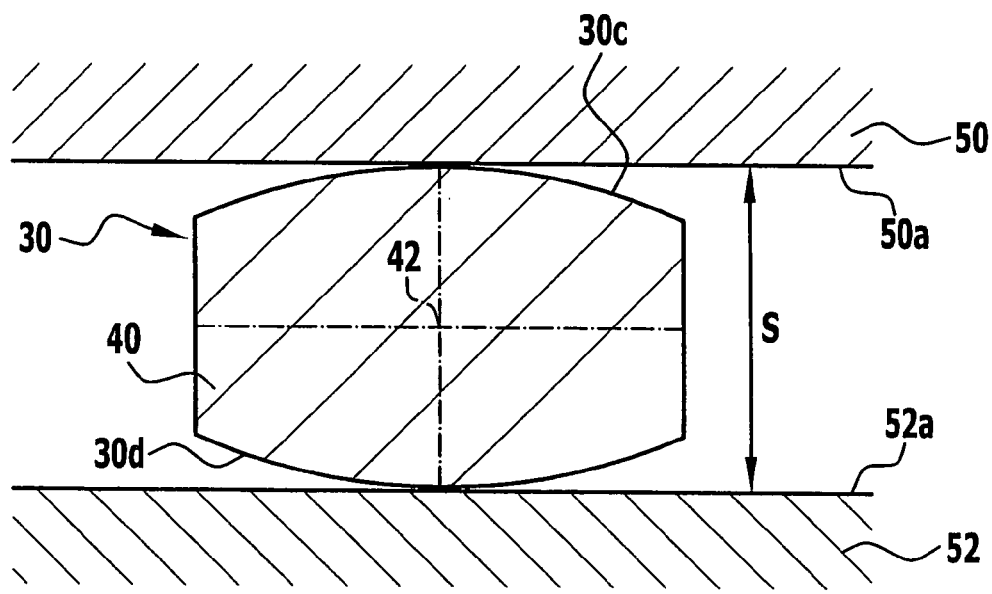
FIG. 3B shows a section corresponding to FIG. 3A, but after the cylinder head screws have been tightened with the specified tightening torque.

FIGS. 3A and 3B show a schematic cross section through a sealing element according to the invention—in this case through a combustion chamber sealing element 30 according to the invention—which is formed by a metallic sealing strand 40 closed within itself, which in a plan view of the cylinder head gasket is circular ring-shaped and has a longitudinal center axis designated 42. The sealing strand 40 does, therefore, not have to be a circular ring-shaped portion of a metal sheet, which is folded back onto itself, but could also be formed by a metallic ring obtained, for example, by a punching procedure, which initially has a cross section in the form of a lying rectangle and by means of reshaping in a stamping tool has then been provided with the convex surfaces 30c and 30d.

In FIGS. 3A and 3B, part of a cylinder head was designated 50 and part of an engine block 52, a sealing surface of the cylinder head was designated 50a and a sealing surface of the engine block 52a.

FIG. 3A shows the combustion chamber sealing element in a position assumed with the cylinder head gasket in the unpressed state or when the cylinder head gasket is already arranged between the engine component sealing surfaces 50a, 52a, but the cylinder head screws have not yet been tightened, so that the combustion chamber sealing element 30 is at least essentially still free of tension. In the course of the tightening of the cylinder head screws and the resulting approach of the engine component sealing surfaces 50a, 52a towards each other, the sealing gap width, i.e., the spacing of the engine component sealing surfaces from one another, is reduced to the assembly dimension denoted by S in FIG. 3B, which has the following effect on the combustion chamber sealing element 30: in the course of the tightening of the cylinder head screws, the forces designated by arrows $F_1$ and $F_2$ in FIG. 3A, which are steadily increased by tightening the cylinder head screws, act on the combustion chamber sealing element 30, more specifically, the forces $F_1$ and $F_2$ forming a pair of forces act on the combustion chamber sealing element at those locations of the convex surfaces 30c and 30d thereof at which these convex surfaces contact the engine component sealing surfaces 50a, 52a. In the course of the tightening of the cylinder head screws the combustion chamber sealing element 30 is, therefore, tilted, and the locations at which the engine component sealing surfaces 50a, 52a and the convex surfaces 30c and 30d contact one another and thus the force vectors $F_1$ and $F_2$ approach one another (in a plan view of the cylinder head gasket), so that the spacing, designated D in FIG. 3A, of the two force vectors $F_1$ and $F_2$ from each other decreases. In the course of this tilting movement, an elastic and, therefore, reversible deformation is imparted to the sealing strand 40 forming the combustion chamber sealing element 30, and a restoring moment designated M in FIG. 3A is built up, which attempts to pivot the combustion chamber sealing element back into its initial position shown in FIG. 3A, more particularly, out of that position which the combustion chamber sealing element assumes after the tightening of the cylinder head screws when the engine is cold and out of operation—this position is shown in FIG. 3B. The combustion chamber sealing element is thus prestressed after the tightening of the cylinder head screws.

As will be apparent from a comparison of FIGS. 3A and 3B, the combustion chamber sealing element 30 is thus able to follow the engine component sealing surfaces 50a, 52a, when their spacing, with the engine running, increases and decreases periodically, so that the combustion chamber sealing element is constantly pressed sealingly against the engine component sealing surfaces.

Merely for the sake of completeness, it is pointed out that the engine component sealing surfaces 50a, 52a shown in FIGS. 3A and 3B may also be regarded as the tangential planes, to which reference was made in the above definition of the basic concept underlying the present invention.

However, the combustion chamber sealing element 30 according to the invention can also roll on the engine component sealing surfaces 50a, 52a in the installed, i.e., pressed state of the cylinder head gasket, more particularly, without sliding friction (if the pressing forces are sufficiently high), so as to compensate the sliding movements mentioned at the outset—the sliding movements of the engine component sealing surfaces 50a, 52a which occur when the engine is running and while the engine is heating up were denoted by arrows pointing in opposite directions in FIG. 3A—and, of course, one engine component sealing surface may also remain stationary and only the other engine component sealing surface become displaced.

In the embodiment shown in FIGS. 3A and 3B, the contour of the convex surfaces 30c, 30d is to be formed by circular arcs whose radius is many times greater than half the thickness of the sealing strand 40 (measured in vertical direction in FIG. 3B).

The tilting movements depicted in FIGS. 3A and 3B are not to be obstructed at least to any appreciable extent by the web-like holding elements 32, i.e., these holding elements should be sufficiently flexible to allow such tilting movements without permanent breakages occurring in the holding elements 32 or their transitions to the combustion chamber sealing element 30 and the actual sheet steel layer 102 occurring during operation of the engine.

The spring characteristic (spring rate) of the sealing element according to the invention is determined by the material characteristics of the sealing strand 40 and the form of its cross section and can be influenced by these two parameters, so that it can be readily ensured that the sealing element according to the invention will always rest sealingly against the engine component sealing surfaces during operation of the engine.

If, in a cylinder head gasket according to the invention, adjacent combustion chamber openings, such as combustion chamber openings 10 and 12, lie extremely close to each other, the space for a web-like area of the actual sheet steel layer 102 and two slots 32 may prove insufficient at the location at which the sealing elements allocated to the two combustion chamber openings come closest to each other. This problem is known with cylinder head gaskets in which sealing is effected directly around the combustion chamber openings by circular ring-shaped beads of the sheet steel layer. In such a case, the sealing beads of two adjacent combustion chamber openings pass over into each other at the constriction between these combustion chamber openings, so that at the narrowest point only a single bead section remains, which has a straight-lined configuration and from which the two sealing beads extend away in approximately the shape of a V, so that in the constriction a bead configuration results, which has the shape of two Ys, which pass over into each other with their "feet". In the case of combustion chamber openings of a cylinder head gasket according to the invention which lie extremely close to each other, the two adjacent combustion chamber elements may analogously pass over into each other in the constriction and similarly form a "double Y configuration", and then no slots 34 and possibly not any narrow web area of the actual sheet steel layer 102 either are present in the constriction.

Figure 4:
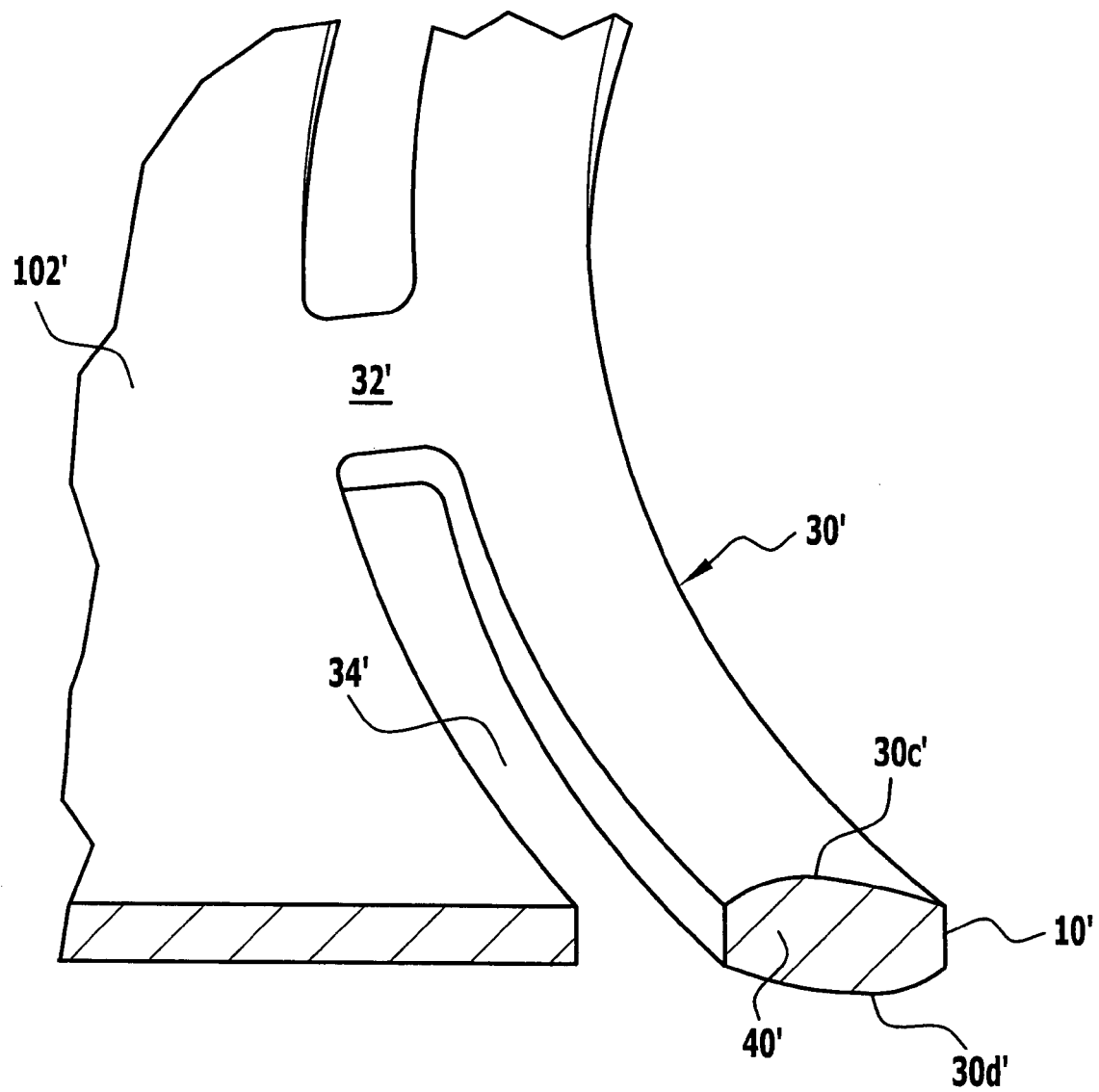
FIG. 4 shows an illustration of a second embodiment, more particularly, corresponding to the right-hand part of FIG. 2.

FIG. 4 shows an alternative embodiment of a sealing element according to the invention, again of a combustion chamber sealing element 30' according to the invention, which is formed by a solid sealing strand 40' which is not produced by folding. Since this embodiment differs from that according to FIG. 2 only in the design of the sealing strand 40', the same reference numerals were used in FIG. 4 as in FIG. 2, but with the addition of a prime, and, therefore, a further description of FIG. 4 may be dispensed with. In the manufacture of the second embodiment shown in FIG. 4, the procedure may, for example, be such that after punching a combustion chamber opening 10' out of the sheet steel layer 102', an edge portion of the sheet steel layer surrounding the combustion chamber opening is first thickened by upsetting and then provided with the convex surfaces 30c' and 30d' in a stamping tool, after which the slots 34' are punched out so as to leave the web-shaped holding elements 32'.

As will be apparent from FIGS. 3A and 3B, the second embodiment of the sealing element according to the invention shown therein is characterized in that the contours or roll-on curves formed by the two convex surfaces 30c, 30d are of the same design and arranged mirror-symmetrically, so that when the cylinder head gasket is installed and the engine is out of operation the crests of these contours lie one over the other (in a plan view of the cylinder head gasket); a lateral offset of the crests thus only occurs as a result of a change in the width of the sealing gap, in particular, in the case of a widening of the sealing gap during operation of the engine when the spacing of the engine component sealing surfaces 50a, 52a becomes larger than the assembly dimension S drawn in FIG. 3B—see FIG. 3A.

Figure 5:
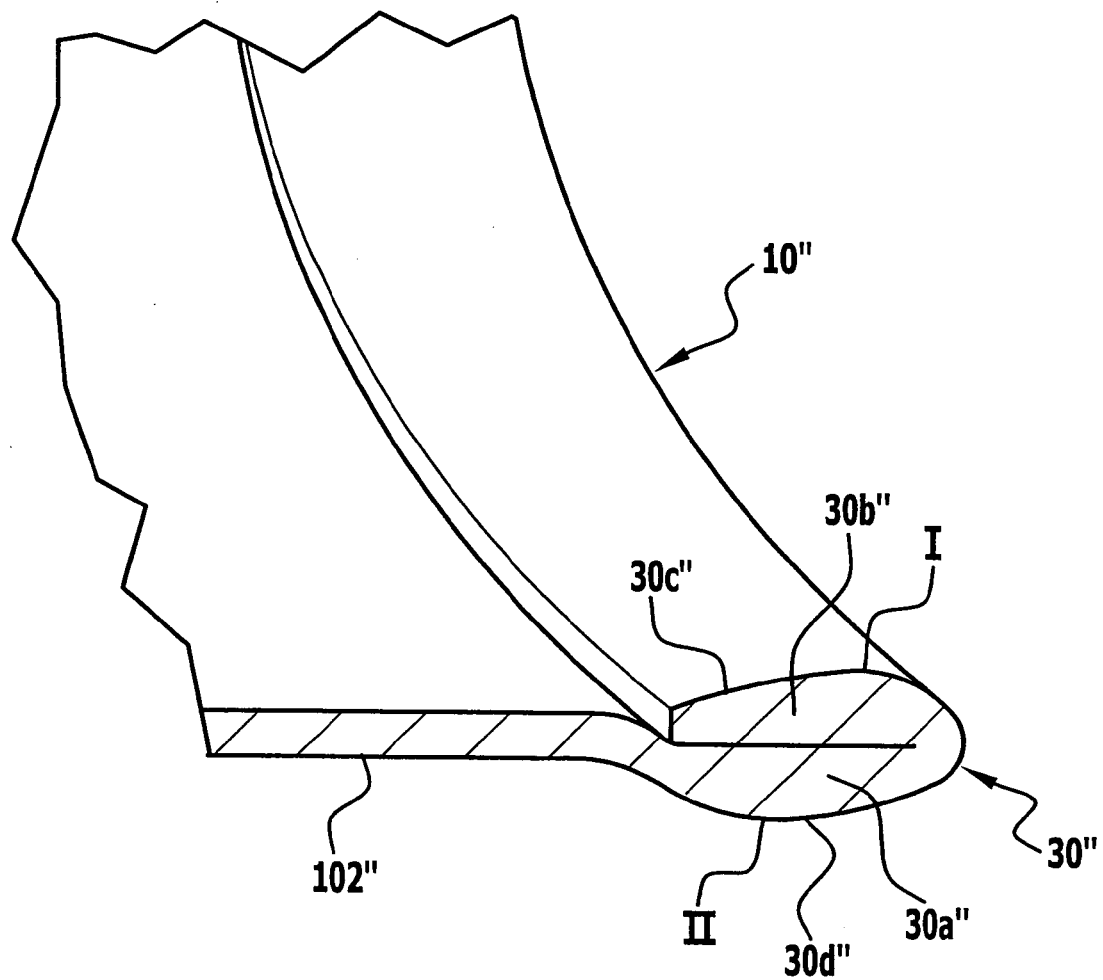
FIG. 5 shows an illustration, corresponding to FIG. 4, of a third embodiment.
Figure 6:
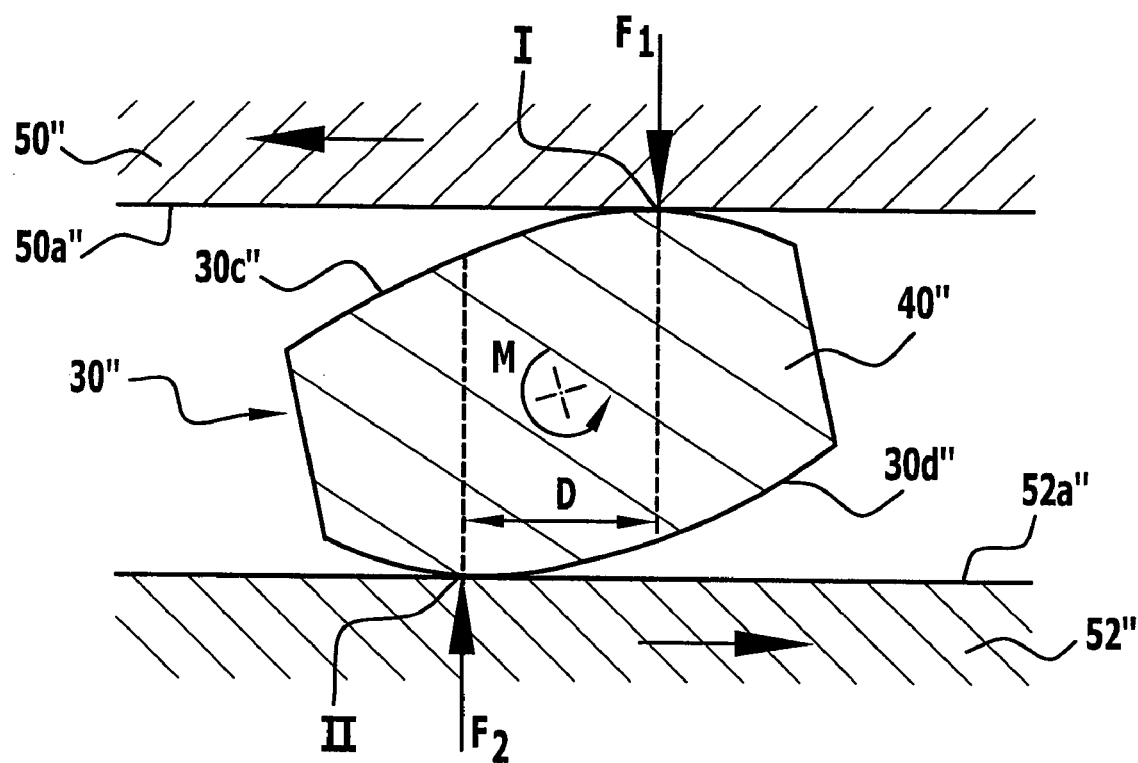
FIG. 6 shows an illustration, corresponding to FIG. 3A, of the third embodiment of the sealing element according to the invention.

In the third embodiment of the sealing element according to the invention shown in FIGS. 5 and 6, its contours are designed in accordance with the invention but differently and, above all, such that the crests of these contours are laterally offset from each other when the cylinder head gasket is installed and the engine is out of operation.

In FIGS. 5 and 6 the same reference numerals were used as in FIGS. 1 and 2, but with the addition of two primes, and, therefore, in the following the third embodiment shown in FIGS. 5 and 6 will only be described insofar as this third embodiment differs from the first embodiment according to FIGS. 1 to 3.

In the third embodiment, too, as will be apparent from FIG. 5, a sealing element 30" according to the invention was produced by a sheet metal layer 102" of the cylinder head gasket according to the invention being folded back onto itself around a combustion chamber opening 10", i.e., the sealing element 30" is again formed by a base portion 30a" of the sheet metal layer 102" and a fold-back portion 30b". When the cylinder head gasket is in the unpressed state, i.e., not yet installed (this state is shown in FIGS. 5 and 6), the crests I and II of the convex surfaces 30c" and 30d" do not lie one over the other, but are offset from one another in the radial direction of the combustion chamber opening 10", as will be particularly clearly apparent from FIG. 6 corresponding to FIG. 3A, and the contours defined by the convex surfaces 30c", 30d" (in a section perpendicular to the longitudinal center axis of the sealing strand 40" forming the sealing element 30") are also not arranged mirror-symmetrically to each other, and, finally, these contours are also different, as is best apparent from FIG. 6.

Starting from the state shown in FIG. 6, in which the cylinder head screws have not yet been tightened, the sealing element 30" is tilted in the course of the tightening of the cylinder head screws, i.e., the clamping of the cylinder head gasket between the engine component sealing surfaces 50a", 52a", about the longitudinal center axis of the sealing strand 40", in the clockwise direction in accordance with FIG. 6, so that the spacing D of the crests at the given time, along which the sealing element 30" is pressed against the engine component sealing surfaces 50a", 52a", decreases—the same applies to the spacing of the two force vectors $F_1$, $F_2$.

In the third embodiment shown in FIGS. 5 and 6, the sealing element 30" is integrally joined right around to the actual sheet metal layer 102", i.e., the slots 34 of the first embodiment are missing—realization of the third embodiment is possible when the sheet metal layer 102" has a thickness that is not too great and possesses spring-elastic characteristics, as is the case with sheet spring steel, and one must bear in mind that the tilt angles of the sealing element 30" occurring during operation of the engine are relatively small. In the third embodiment, the restoring moment M (see FIG. 6) built up in the course of the tightening of the cylinder head screws can be generated at least substantially by that area of the sheet metal layer 102" along which the sealing element 30" passes over into the actual sheet metal layer 102" and which is subjected to bending stress during the tilting of the sealing element—this circular ring-shaped area, which encloses the sealing element 30", was omitted, for reasons of simplicity, in FIG. 6, as was the sheet metal layer 102" itself.

In the manufacture of the third embodiment shown in FIG. 5, it is again expedient for the procedure to be such that the sheet metal layer 102" is first folded back onto itself, and in the same tool or in a tool used thereafter a stamping procedure is then carried out for shaping the convex surfaces 30c", 30d". In order to be able to carry out the fold-back procedure without any difficulty, it may be necessary to use a sheet metal which does not yet have any spring steel characteristics as starting material and to subject the sheet metal to a heat treatment after the folding-over and stamping procedure in order to create spring-elastic characteristics.

The invention claimed is:

1. An at least substantially metallic cylinder head gasket with a gasket plate having two main surfaces and comprising at least one sheet steel layer and at least one through-opening, which, for sealing around the through-opening, is enclosed by a ring-shaped sealing element comprising an elastic metallic sealing strand continuously enclosing said through-opening and having a longitudinal center axis and being pressed when the cylinder head gasket is installed between engine component sealing surfaces, said sealing element being shaped and integrally joined to said sheet steel layer so that at least sections of the sealing strand are elastically tiltable about its longitudinal center axis and so that during said tilting a restoring moment is built up as a result of a spring-elastic deformation of the sealing element about said longitudinal center axis, wherein the sealing element is held in the cylinder head gasket by flexible holding elements which are formed by said sheet steel layer, have the form of a web or tongue, extend transversely outwardly from the sealing element and are at least substantially unpressed when the cylinder head gasket is installed, and wherein said sheet steel layer has openings at the outer circumference of the combustion chamber sealing element and between said holding elements so that the holding elements are arranged in spaced relation to one another along the circumference of the sealing element, wherein at the sides of said sealing element facing the two main surfaces of the gasket plate, in cross section perpendicular to the longitudinal center axis of the sealing strand, the sealing element is at each of said sides of such spherical shape as to result in only one first contact surface of the sealing element that faces one of said main surfaces of the gasket plate and in only one second contact surface of the sealing element that faces the other one of said main surfaces of the gasket plate, each of said contact surfaces being convex around the combustion chamber through-opening also when the gasket is installed and pressed and having a crest continuously enclosing said through-opening, wherein, in the unpressed state of the cylinder head gasket, these crests of said sealing element, in cross section perpendicular to the longitudinal center axis of the sealing strand, are laterally offset from one another in the direction of a gasket plane defined by the gasket plate so that the spacing of planes running parallel to the gasket plane and tangentially to the convex surfaces of the sealing element varies when these convex surfaces tilt about the longitudinal center axis of the sealing strand.

2. The cylinder head gasket in accordance with claim 1, wherein the sealing element is uncovered at the two main surfaces of the cylinder head gasket for pressing of the sealing element against the engine component sealing surfaces.

3. The cylinder head gasket in accordance with claim 2, wherein the thickness and the compressive strength of the sealing element and also the material thereof are adapted to the specified materials of the engine component sealing surfaces and to the specified tightening torque of the cylinder head screws so that upon occurrence of movements of the engine component sealing surfaces relative to one another during operation of the engine, the sealing element does at least substantially only roll on and not slide on the engine component sealing surfaces.

4. The cylinder head gasket in accordance with claim 1, wherein the gasket plate comprises only a single sheet metal layer.

5. The cylinder head gasket in accordance with claim 1, wherein the sealing strand is elastically twistable about its longitudinal center axis.

6. The cylinder head gasket in accordance with claim 1, wherein in cross section perpendicular to the longitudinal center axis of the sealing strand the radii of curvature of the convex surfaces are larger than half the thickness of the sealing element measured perpendicularly to the gasket plane.

7. The cylinder head gasket in accordance with claim 1, wherein the cross section of the sealing strand corresponds approximately to a rectangle with spherical longitudinal sides.

8. The cylinder head gasket in accordance with claim 1, the gasket plate of which has screw holes for cylinder head screws, wherein the holding elements are arranged at locations on the sealing element, each of which lies closest to one of the screw holes.

9. The cylinder head gasket in accordance with claim 1, wherein the sheet steel layer has elongate openings at the outer circumference of the sealing element between the holding elements.

10. The cylinder head gasket in accordance with claim 1, wherein the sealing element is formed by an edge portion of the sheet steel layer, which surrounds the through-opening and is folded back onto the sheet steel layer.

11. The cylinder head gasket in accordance with claim 1, wherein the through-opening is a combustion chamber opening and the sealing element is a combustion chamber sealing element.

* * * * *